United States Patent
Hayes

(10) Patent No.: US 10,839,582 B2
(45) Date of Patent: *Nov. 17, 2020

(54) MAP DECLUTTER

(71) Applicant: Insitu, Inc., Bingen, WA (US)

(72) Inventor: Andrew Royds Hayes, Bingen, WA (US)

(73) Assignee: INSITU, INC., Bingen, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/529,574

(22) Filed: Aug. 1, 2019

(65) Prior Publication Data

US 2020/0111243 A1      Apr. 9, 2020

Related U.S. Application Data

(63) Continuation of application No. 14/453,512, filed on Aug. 6, 2014, now Pat. No. 10,380,775.

(60) Provisional application No. 61/872,380, filed on Aug. 30, 2013.

(51) Int. Cl.
  *G06T 11/60*    (2006.01)
  *G08G 5/00*     (2006.01)
  *G06F 3/00*     (2006.01)

(52) U.S. Cl.
  CPC .......... *G06T 11/60* (2013.01); *G06F 3/00* (2013.01); *G08G 5/0013* (2013.01); *G08G 5/0026* (2013.01); *G08G 5/0056* (2013.01); *G08G 5/0069* (2013.01); *G08G 5/0082* (2013.01)

(58) Field of Classification Search
  None
  See application file for complete search history.

(56) References Cited

U.S. PATENT DOCUMENTS

| | | |
|---|---|---|
| 2012/0310524 A1 | 12/2012 | Pepitone et al. |
| 2014/0249744 A1* | 9/2014 | Andersson ......... G01C 21/3461 701/410 |
| 2014/0306950 A1 | 10/2014 | Russi et al. |
| 2015/0140954 A1 | 5/2015 | Maier et al. |

OTHER PUBLICATIONS

O'Hara, Stephen, and Nathan Dwyer. "An agent-based approach to decluttering the interfaces of multi-UAV command and control systems." Unmanned Systems Technology IX. vol. 6561. International Society for Optics and Photonics, 2007. (Year: 2007).*
McVay, Aaron, Daniel Krisher, and Patrick Fisher. Jview visualization for virtual airspace modeling and simulation. CACI Technologies Inc Rome NY, 2009. (Year: 2009).*
Pfautz, Stacy Lovell, et al. "Agent based intelligent decluttering enhancements." Workshops at the Twenty-Fifth AAAI Conference on Artificial Intelligence. 2011. (Year: 2011).*

(Continued)

*Primary Examiner* — Ryan M Gray
(74) *Attorney, Agent, or Firm* — Gates & Cooper LLP

(57) ABSTRACT

Methods, devices, and systems may be used to automatically declutter a map. In an example, operations may be effectuated that include displaying a map of a region with a plurality of objects and responsive to receiving an alert within the region, automatically providing instructions to display a subset of the plurality of objects. The subset of the plurality of objects may be selected based on an unmanned aerial vehicle associated with the region.

20 Claims, 7 Drawing Sheets

(56) References Cited

OTHER PUBLICATIONS

Calhoun, Gloria L., et al. "Synthetic vision system for improving unmanned aerial vehicle operator situation awareness." Enhanced and Synthetic Vision 2005. vol. 5802. International Society for Optics and Photonics, 2005.*

Scott, Stacey D., et al. Designing Decision and Collaboration Support Technology for Operators in Multi-UAV Operations Teams. MIT Humans and Automation Laboratory, 2007.*

Pfautz, Stacy Lovell, et al. "Agent Based Intelligent Decluttering Enhancements." Scalable Integration of Analytics and Visualization, 2011.

O'Hara, S., et al., "An agent-based approach to decluttering the interfaces of multi-UAV command and control systems." Unmanned Systems Technology IX, vol. 6561, International Society for Optics and Photonics, 2007.

O'Hara, S., et al.,"Agent-based reduction of information density (ARID) demonstration." Proceedings of the 6th international joint conference on Autonomous agents and multiagent systems, ACM, 2007.

Getzlaff, J.A., et al., "Coginitve Task Analysis of Distributed Network-Centric Information for the Promotion of Shared Situational Awareness Within Collaborative LIAS Operations." (2009).

O'Hara, S., et al., "Intelligent Agents for Decluttering Command-and-Control Displays", Integration of Knowledge Intensive Multi-Agent Systems, 2007, KIMAS 2007, International Conference on IEEE, 2007.

* cited by examiner

MAP DECLUTTER

CROSS REFERENCE TO RELATED APPLICATIONS

This application is a continuation of U.S. patent application Ser. No. 14/453,512, entitled "MAP DECLUTTER," by Andrew Royds Hayes, et al, filed Aug. 6, 2014, now issued as U.S. Pat. No. 10,380,775, which application claims benefit under 35 U.S.C. § 119(e) of U.S. Provisional Patent Application No. 61/872,380, filed Aug. 30, 2013, the both of which applications are hereby incorporated herein by reference in their entireties.

BACKGROUND

Unmanned aerial vehicles (UAVs) may have a range of uses such as reconnaissance and operating as combat-ready sensor and weapons platforms. A UAV may launch and execute a mission by flying to one or more points of interest along a predefined route. An operator may load the points of interest such as launch and landing locations into the UAV as a mission flight plan that the operator develops using a flight planner or ground control station with a graphical user interface. The flight path of the UAV may be tracked on a map.

SUMMARY

Disclosed are methods, devices, and systems for decluttering a map. In an example, there may be a method that includes displaying a map of a region, the map of the region including a plurality of objects. The method further includes receiving an alert from an unmanned aerial vehicle in the region and displaying a subset of the plurality of objects on the map of the regions wherein the subset of the plurality of objects is based on the alert.

In an example, there may be a system comprising a display, a processor communicatively connected with the display, and a memory coupled to the processor. The memory may have stored thereon executable instructions that when executed by the processor cause the processor to effectuate operations that include providing instructions to display a map of a region, the map of the region including a plurality of objects, receiving an alert indicative of an emergency located within the region, and responsive to receiving the alert, automatically providing instructions to display a subset of the plurality of objects wherein the subset of the plurality of objects is based on an unmanned aerial vehicle being involved with the emergency.

In an example, there may be a processor and a memory communicatively connected with the processor. The memory may have stored thereon executable instructions that when executed by the processor cause the processor to effectuate operations that include receiving an alert indicative of an emergency located within a region and responsive to receiving the alert, automatically providing instructions to display a subset of a plurality of objects on a map, the subset of the plurality of objects based on an unmanned aerial vehicle being involved with the emergency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EXAMPLES

Disclosed are methods, devices, and systems for decluttering a map. In an example, there may be a method that includes receiving an alert from an unmanned aerial vehicle in a region and displaying a subset of a plurality of objects on a map of the regions wherein the subset of the plurality of objects is based on the alert.

Figure 1:
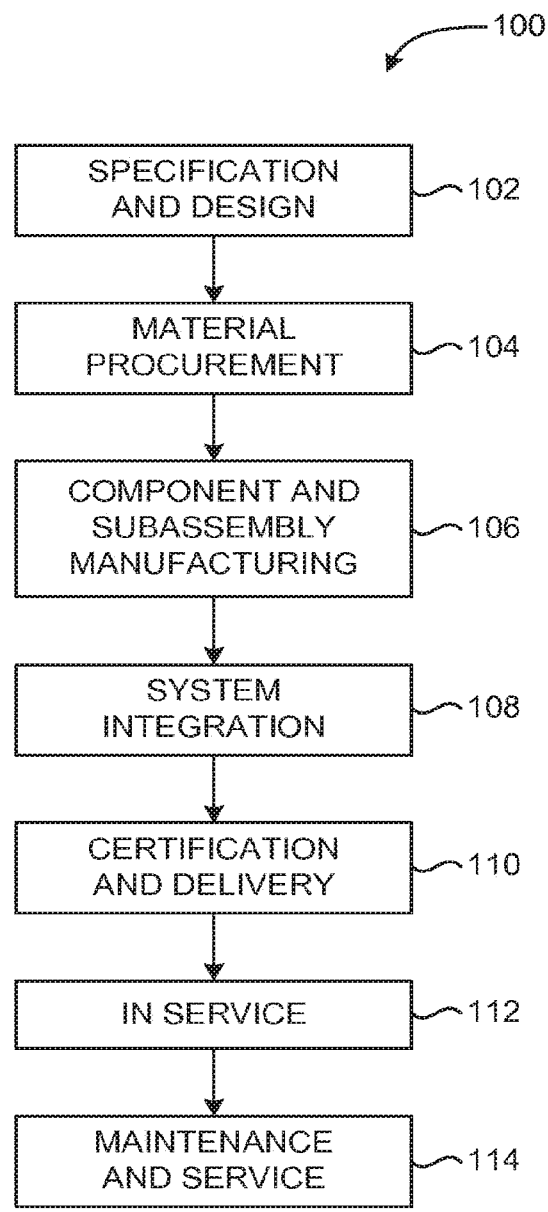
FIG. 1 depicts a flow diagram of an aircraft production and service methodology.
Figure 2:
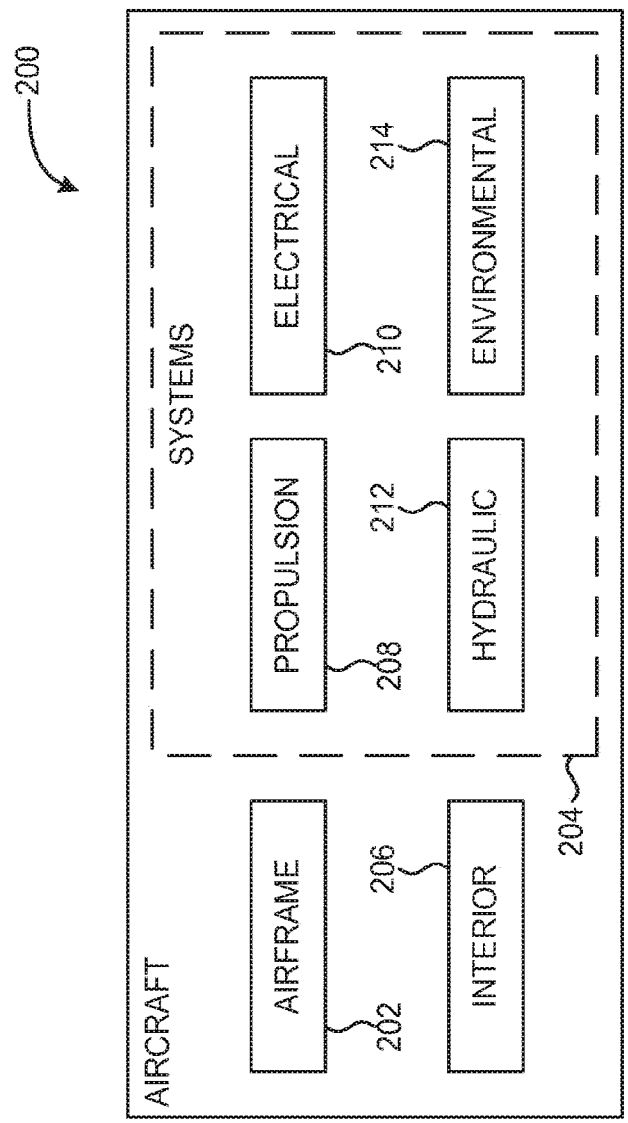
FIG. 2 depicts a block diagram of an aircraft.

Examples in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114, which may also include modification, reconfiguration, refurbishment, and so on.

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers. An operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Figure 3:
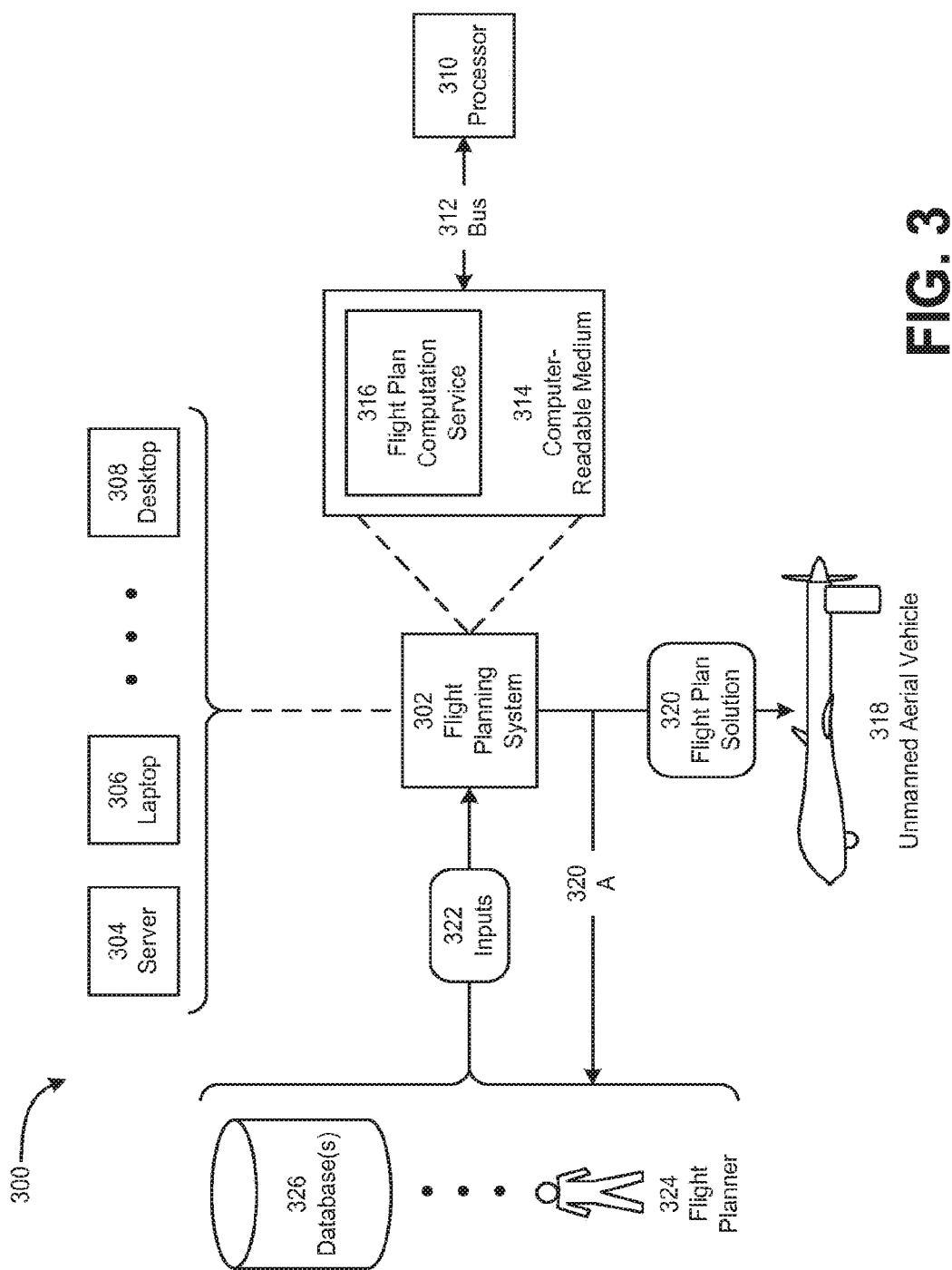
FIG. 3 depicts a block diagram illustrating systems or operating environments for controlling unmanned aerial vehicles (UAVs)

FIG. 3 illustrates systems or operating environments, denoted generally at 300, that provide flight plans for UAVs while routing around obstacles having spatial and temporal dimensions. These systems 300 may include one or more flight planning systems 302. FIG. 3 illustrates several examples of platforms that may host the flight planning system 302. These examples may include one or more server-based systems 304, one or more portable computing systems 306 (whether characterized as a laptop, notebook, tablet, or other type of mobile computing system), and/or one or more desktop computing systems 308. As detailed elsewhere herein, the flight planning system 302 may be a ground-based system that performs pre-flight planning and route analysis for the UAVs, or may be a vehicle-based system that is housed within the UAVs themselves.

Implementations of this description may include other types of platforms as well, with FIG. 3 providing non-limiting examples. For example, the description herein contemplates other platforms for implementing the flight planning systems, including but not limited to wireless personal digital assistants, smartphones, or the like. The graphical elements used in FIG. 3 to depict various components are chosen only to facilitate illustration, and not to limit possible implementations of the description herein.

Turning to the flight planning system 302 in more detail, it may include one or more processors 310, which may have a particular type or architecture, chosen as appropriate for particular implementations. The processors 310 may couple to one or more bus systems 312 that are chosen for compatibility with the processors 310.

The flight planning systems 302 may include one or more instances of computer-readable storage media 314, which couple to the bus systems 312. The bus systems may enable the processors 310 to read code and/or data to/from the computer-readable storage media 314. The media 314 may represent storage elements implemented using any suitable technology, including but not limited to semiconductors, magnetic materials, optics, or the like. The media 314 may include memory components, whether classified as RAM, ROM, flash, or other types, and may also represent hard disk drives.

The storage media 314 may include one or more modules 316 of instructions that, when loaded into the processor 310 and executed, cause the server 302 to provide flight plan computation services for a variety of UAVs 318. These modules may implement the various algorithms and models described and illustrated herein.

The UAVs 318 may be of any convenient size and/or type as appropriate for different applications. In different scenarios, the UAVs may range from relatively small drones to relatively large transport aircraft. Accordingly, the graphical illustration of the UAV 318 as shown in FIG. 1 is representative only, and is not drawn to scale.

The flight plan services 316 may generate respective flight plan solutions 320 for the UAVs 318 based on inputs 322, with flight planning personnel 324 and/or one or more databases 326 providing inputs 322.

Assuming that the flight plan services 316 define one or more solutions 320, the flight planning system 302 may load the solutions into the UAVs 318, as represented by the arrow connecting blocks 302 and 318 in FIG. 3. In addition, the flight planning system 302 may also provide the solutions 320 to the flight planner 324 and/or the databases 326, as denoted by the arrow 320A.

Figure 4:
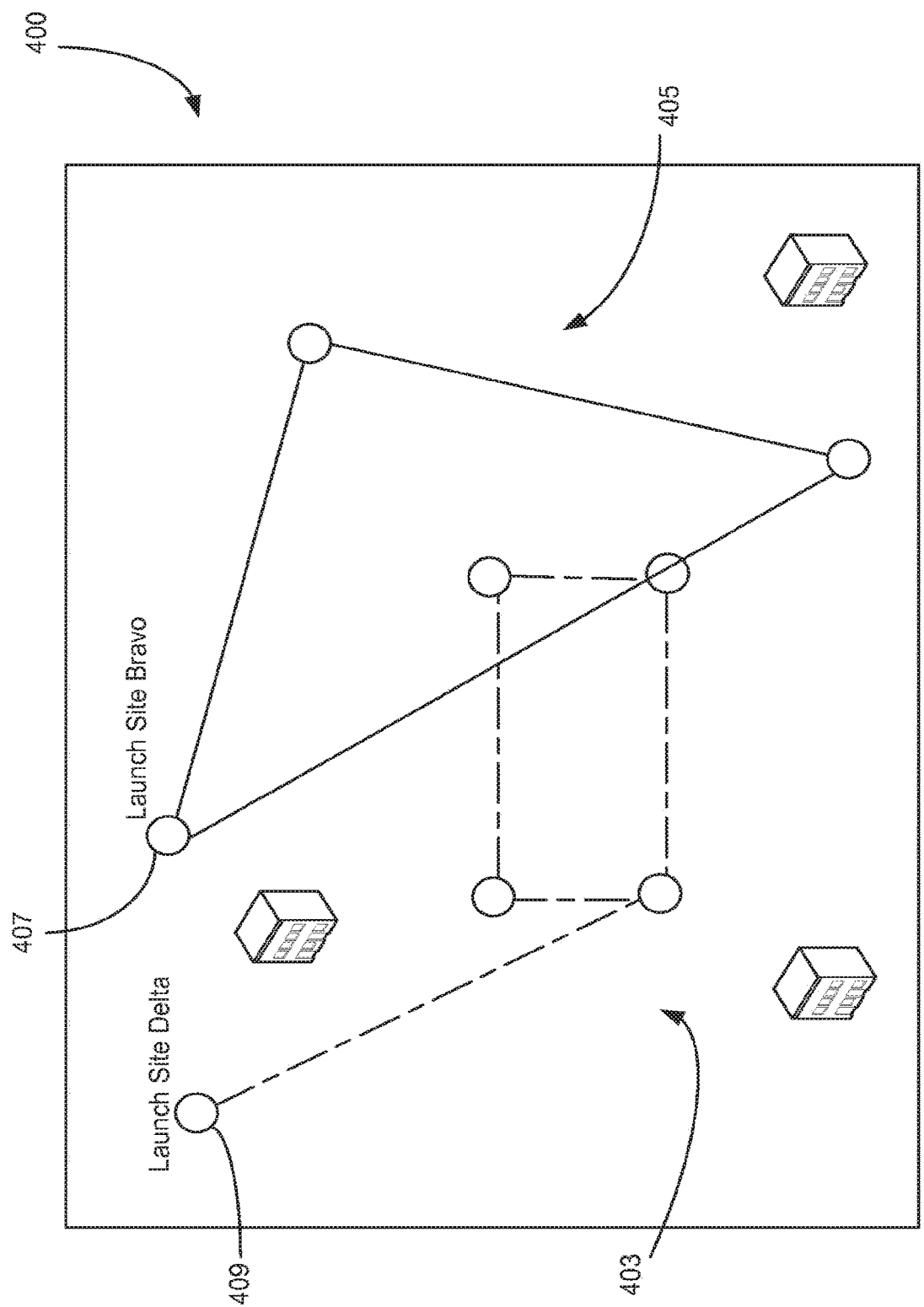
FIG. 4 is an illustration of a map associated with a UAV.

FIG. 4 is an illustration of a map 400 associated with a UAV. Map 400 includes a UAV flight path 403 (dotted lines) and a UAV flight path 405 (solid lines). As indicated on map 400, there are launch sites Delta 409 and Bravo 407. In an example, a graphical user interface (GUI) may display map 400 of a region including points of interest based on a UAV. The map 400 may show a region including a current location of a UAV, the flight path of the UAV, historical (e.g., previous) flights of the UAV, launch location of the UAV (e.g., Delta 409 and Bravo 407), landing location of the UAV, buildings of interest, and flight paths of other UAVs, among other things. Simple geometric shapes, bitmap pictures, a combination of the aforementioned, or the like may represent the points of interest. Next to each point of interest there may be text including information associated with the point of interest, such as height of the UAV, speed of the UAV, or a name of a launch site (e.g., "Launch Site Delta").

Figure 5:
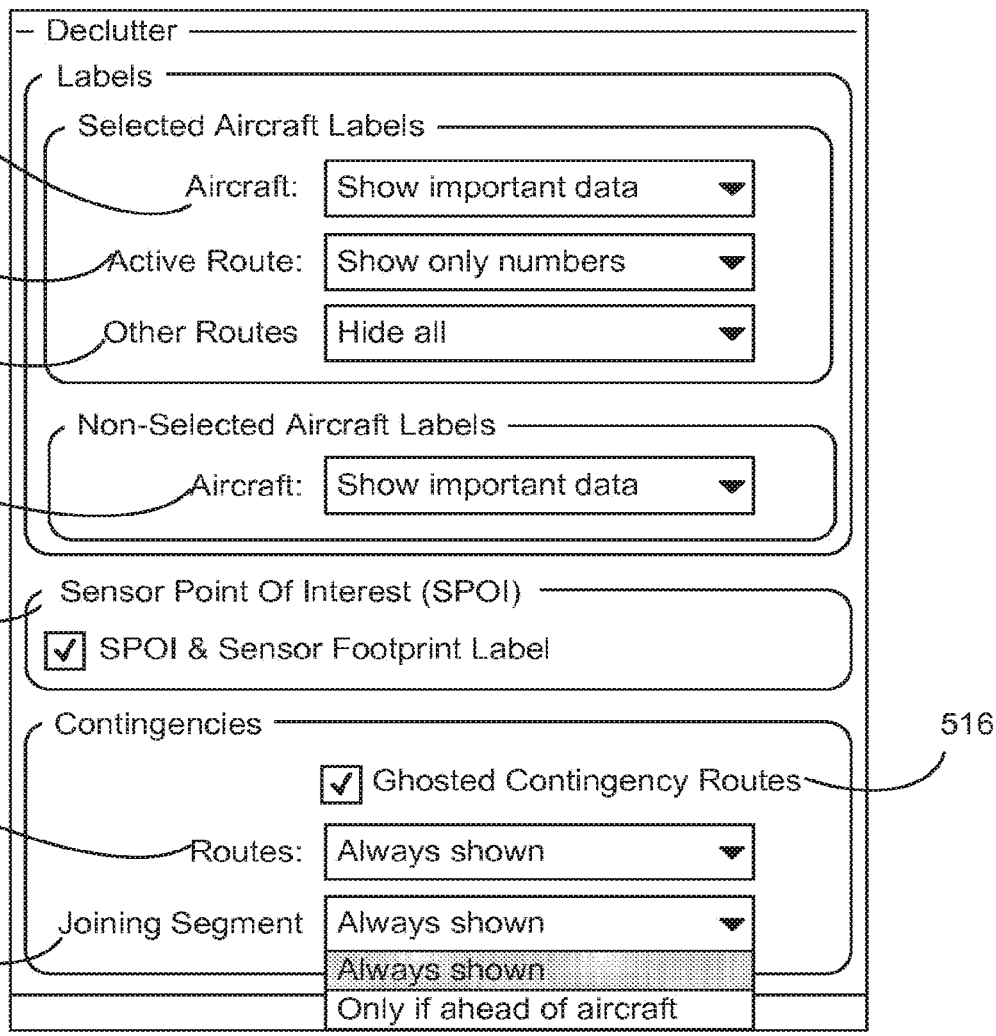
FIG. 5 illustrates a declutter interface.

Points of interest and other objects may be removed manually or automatically from a UAV associated map. In an example, a user may select points of interest or other objects that may be shown on the map. FIG. 5 illustrates an example declutter interface 500. Declutter interface 500 has several selectable options for the objects shown on a UAV associated map. An object may include a simple representative geometric shape (e.g., a closed polygon, line segment, joining segment, or circle) or a more complex image, such as a picture of a building, terrain, or an aircraft. Declutter interface 500 has options regarding displayed labels associated with one or more UAVs, such as aircraft labels 502, active routes 504, and other routes 506, among other things. For selected aircraft labels 502 and non-selected aircraft labels 508 there may be several options to select including show important data, show all data, and show name. For example, the option "show name for selected aircraft labels" 502, if selected, may only show the name of the UAV without other related UAV information such as altitude, speed, or heading. For active route 504 and other routes 506 there may be several options to select such as show all data, show only numbers, and hide all. For example, the option "show only numbers for active route" 504, if selected, may only show the number instead of the route name or other information describing the route, such as altitude. The option "important data" may be defined as data that is useful to maintain the operator's situational awareness of a given object. The goal is to ensure operators can see that information displayed next to each instance of an object on the map. In the case of a UAV that may include vehicle speed, altitude, etc.

Declutter interface 500 also has a selectable option sensor point of interest (SPOI) 510 for showing SPOI data. Most sensors have an area of coverage on the ground. In the case of a camera (electrical-optical and/or infrared) that coverage looks like a box projected onto the ground and maps to the edges of the video screen. The SPOI, in the case of video, is defined as the center of that box. In simple terms it represents where the camera is looking. By dragging the SPOI icon on the map operators can relocate where a camera is pointing.

Declutter interface 500 may also have a selectable option for displaying contingencies. The contingency routes may be displayed as ghosted contingency routes. The ghosted contingency routes may be a light colored or semi-transparent line that displays the contingency route. The term route as associated with a UAV may be considered a collection of waypoints put together. Contingency routes may be considered a change in the primary route of a UAV based on a situation, such as an emergency. In an example, a Contingency A route and a Contingency B route may be defined. For example, Contingency A route may be a first route that a UAV should take if a wing or other portion of the UAV is damaged. Contingency B route may be a route that a UAV should take if there is a loss in communication to a flight planning system. As can be imagined, if all contingency routes are simultaneously shown for every waypoint of a UAV route, the display may be come cluttered for an operator. The selectable options of ghost contingency routes 516 and the selectable options for routes 512 and joining segments 514 (e.g., only if ahead of aircraft) allow for a display to have less clutter. For example, an option "only if ahead of aircraft" may show a contingency route only for the next waypoint and not for waypoints that were already passed by the UAV or waypoints beyond the next waypoint.

Points of interest and other objects may also be removed automatically from a UAV associated map. For example, an alert may be received from an unmanned aerial vehicle in a region and a subset of a plurality of objects on a map of the region may be displayed, wherein the subset of the plurality of objects is based on the alert. An alert may include the unmanned aerial vehicle arriving at a waypoint, the unmanned aerial vehicle being in a condition indicative of an emergency, or the unmanned aerial vehicle sensing one of the plurality of objects. In another example, automatic removal of objects from a UAV associated map may be based on time thresholds (e.g., most recent executed flight paths), an emergency, a UAV sensor detecting a particular structure (e.g., a building), and the like. In an example, a UAV may be deployed for an emergency. The UAV may already be in flight or may be launched as a result of the emergency. The emergency may be a search and rescue mission or engaging an enemy combatant, for example. The map displaying one or more UAV associated objects may be cluttered. Objects may be automatically removed when an emergency situation arises in order to remove or minimize the clutter on the display. When there are objects associated with a plurality of UAVs on a display, objects regarding the UAV(s) associated with the emergency may remain on the screen while the objects associated with the non-emergency UAV(s) are removed from the screen or substantially minimized (e.g., removing non-essential historical paths and descriptive text).

Figure 6:
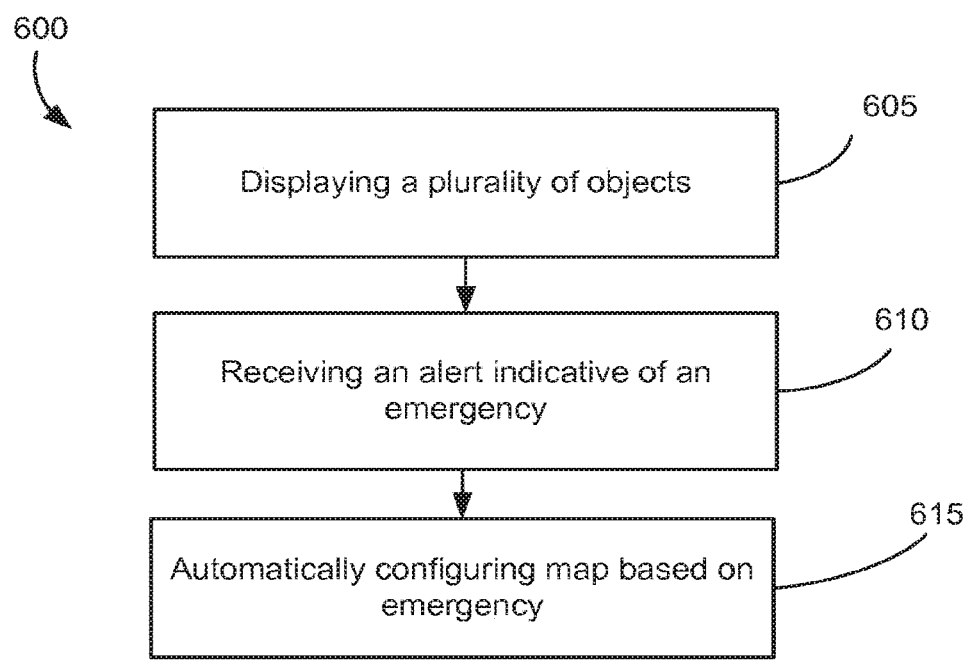
FIG. 6 illustrates an example method for decluttering a map associated with a UAV.

FIG. 6 illustrates an example method 600 for decluttering a map associated with a UAV. At block 605, a plurality of objects associated with one or more UAVs are displayed on a map of a region. As stated herein, the objects may include points of interest such as a current location of a UAV, the flight path of the UAV, historical (e.g., previous) flight paths of the UAV, launch and landing location of the UAV, buildings of interest, and flight paths of other UAVs, among other things. At block 610, an alert indicative an emergency may be received. The emergency may be associated with one or more UAVs. For example, a first UAV may be in an emergency state (e.g., crash landing or on the verge of crash landing) and a second UAV may be selected to respond to the emergency. In another example, a UAV may be selected to respond to search and rescue of a person. At block 615, responsive to a device receiving the emergency alert, a map may be automatically configured by the device to display on a GUI. The map may show just the objects related with the UAV(s) associated with the emergency alert. In another example, once a threshold number of UAVs are displayed on a map, the map may be automatically configured by the device to display particular information. The amount of objects associated with the UAV shown on the map for a particular UAV may be based on the priority level set for the UAV. So the higher the priority of the UAV the more (or different) objects associated with the UAV may be displayed. The display of different objects may include displaying simple geometric shapes instead of bitmap pictures, a combination of simple geometric shapes instead of bitmap pictures, or the like.

Figure 7:
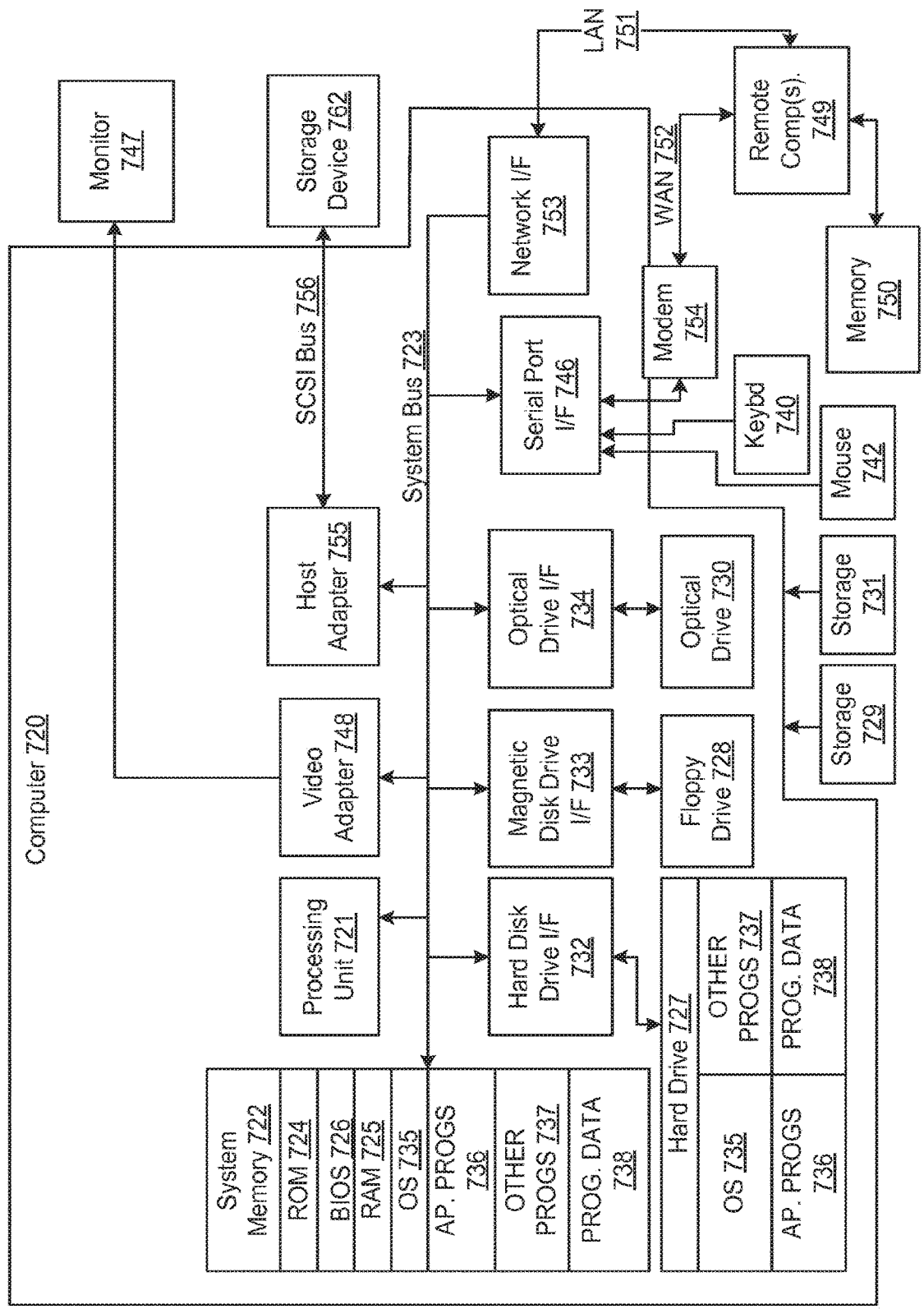
FIG. 7 is a block diagram representing a general purpose computer system in which aspects of the methods and systems disclosed herein or portions thereof may be incorporated.

FIG. 7 and the following discussion are intended to provide a brief general description of a suitable computing environment in which the methods and systems disclosed herein and/or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 7 is a block diagram representing a general purpose computer system in which aspects of the methods and systems disclosed herein and/or portions thereof may be incorporated. As shown, the general purpose computing system includes a computer 720 or the like, including a processing unit 721, a system memory 722, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read-only memory (ROM) 724 and random access memory (RAM) 725. A basic input/output system 726 (BIOS), containing the basic routines that help to transfer information between elements within the computer 720, such as during start-up, is stored in ROM 724.

The computer 720 may further include a hard disk drive 727 for reading from and writing to a hard disk (not shown), a magnetic disk drive 728 for reading from or writing to a removable magnetic disk 729, and an optical disk drive 730 for reading from or writing to a removable optical disk 731 such as a CD-ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide non-volatile storage of computer readable instructions, data structures, program modules and other data for the computer 720. As described herein, computer-readable media is a tangible, physical, and concrete article of manufacture and thus not a signal per se.

Although the environment described herein employs a hard disk, a removable magnetic disk 729, and a removable optical disk 731, it should be appreciated that other types of computer readable media which can store data that is accessible by a computer may also be used in the operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 729, optical disk 731, ROM 724 or RAM 725, including an operating system 735, one or more application programs 736, other program modules 737 and program data 738. A user may enter commands and information into the computer 720 through input devices such as a keyboard 740 and pointing device 742. Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, a computer may include other peripheral output devices (not shown), such as speakers and printers. The system of FIG. 7 also includes a host adapter 755, a Small Computer System Interface (SCSI) bus 756, and an external storage device 762 connected to the SCSI bus 756.

The computer 720 may operate in a networked environment using logical connections to one or more remote computers, such as a remote computer 749. The remote computer 749 may be a personal computer, a server, a router, a network PC, a peer device or other common network node, and may include many or all of the elements described above relative to the computer 720, although only a memory storage device 750 has been illustrated in FIG. 7. The logical connections depicted in FIG. 7 include a local area network (LAN) 751 and a wide area network (WAN) 752. Such networking environments are commonplace in offices, enterprise-wide computer networks, intranets, and the Internet.

When used in a LAN networking environment, the computer 720 is connected to the LAN 751 through a network interface or adapter 753. When used in a WAN networking environment, the computer 720 may include a modem 754 or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are examples and other means of establishing a communications link between the computers may be used.

Computer 720 may include a variety of computer readable storage media. Computer readable storage media can be any available media that can be accessed by computer 720 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 720. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method for decluttering a map, the method comprising:
    displaying, by a display device, the map of a region, the map of the region including a plurality of objects and aircraft labels associated with a plurality of unmanned aerial vehicles (UAVs), the objects including at least one geometric shape or image;
    receiving an alert from at least one of the UAVs in the region; and
    in response to the received alert, automatically decluttering the map by removing at least one object or aircraft label such that a selected subset of the plurality of objects and aircraft labels is displayed, the decluttering comprising removing all objects but the objects associated with UAVs associated with the alert, wherein the decluttered map shows just the objects associated with the UAVs associated with the alert, and a type or an amount of objects associated with each of the UAVs associated with the alert are displayed based on a type of the associated UAV.

2. The method of claim 1, wherein:
    the method further comprises receiving a setting of a priority level for each of the UAVs; and
    more or different objects are displayed for UAVs having an associated priority level higher than at least one other of the plurality of UAVs.

3. The method of claim 2, wherein the objects associated with each of the UAVs associated with the alert are displayed according to a priority level set for the associated UAV.

4. The method of claim 1, wherein the alert comprises at least one of:
the at least one of the UAVs arriving at a waypoint,
the at least one of the UAVs being in a condition indicative of an emergency, or
the at least one of the UAVs sensing one of the plurality of objects.

5. The method of claim 1, wherein the subset of the plurality of objects comprises a route number.

6. The method of claim 1, wherein the subset of the plurality of objects comprises an active route for the at least one of the UAVs.

7. The method of claim 1, wherein the subset of the plurality of objects comprises contingency routes.

8. A system comprising;
a display;
a processor communicatively connected with the display; and
a memory coupled to the processor, the memory having stored thereon executable instructions that when executed by the processor cause the processor to effectuate operations comprising:
providing instructions to display a map of a region, the map of the region including a plurality of objects and aircraft labels associated with a plurality of unmanned aerial vehicles (UAVs), the objects including at least one geometric shape or image;
receiving an alert from at least one of the UAVs in the region, the alert indicative of an emergency located within the region regarding at least one of the plurality of UAVs in the region; and
responsive to receiving the alert, automatically providing instructions to declutter the map by removing at least one object or aircraft label such that a selected subset of the plurality of objects and aircraft labels is displayed, the subset of the plurality of objects includes only the objects involved with the emergency, wherein the decluttered map shows just the objects associated with the UAVs associated with the alert and a type or an amount of objects associated with each of the UAVs associated with the alert are displayed based on a type of the associated UAV.

9. The system of claim 8, wherein:
the operations further comprise operations for receiving a setting of a priority level for each of the UAVs; and
more or different objects are displayed for UAVs having an associated priority level higher than at least one other of the plurality of UAVs.

10. The system of claim 9, wherein the decluttered map shows just the objects associated with the UAVs associated with the alert and the objects associated with each of the UAVs associated with the alert are displayed according to a priority level set for the associated UAV.

11. The system of claim 8, wherein the subset of the plurality of objects comprises an active route for the UAVs.

12. The system of claim 8, wherein the subset of the plurality of objects comprises contingency routes.

13. The system of claim 12, wherein the contingency routes are displayed as ghost routes.

14. A device comprising;
a processor; and
a memory coupled to the processor, the memory having stored thereon executable instructions that when executed by the processor cause the processor to effectuate operations comprising:
displaying a map of a region, the map of the region including a plurality of objects and aircraft labels associated with one or more unmanned aerial vehicles (UAVs), the objects including at least one geometric shape or image;
receiving an alert from at least one of the UAVs in the region, the alert indicative of an emergency located within a region; and
responsive to receiving the alert, automatically decluttering the map by removing at least one object or aircraft label such that a selected subset of the plurality of objects and aircraft labels is displayed, the decluttering comprising removing all of the objects except the objects associated with UAVs associated with the alert, wherein the decluttered map shows just the objects associated with the UAVs associated with the alert and a type or an amount of objects associated with each of the UAVs associated with the alert are displayed based on a type of the associated UAV.

15. The device of claim 14, wherein:
the operations further comprise operations for receiving a setting of a priority level for each of the UAVs; and
more or different objects are displayed for UAVs having an associated priority level higher than at least one other of the plurality of UAVs.

16. The device of claim 15, wherein the objects associated with each of the UAVs associated with the alert are displayed according to a priority level set for the associated UAV.

17. The device of claim 14, wherein the plurality of objects comprises a route number.

18. The device of claim 14, wherein the plurality of objects comprises an active route for the unmanned aerial vehicle.

19. The device of claim 14, wherein the plurality of objects comprises contingency routes.

20. The device of claim 19, wherein the contingency routes are displayed as ghost routes.

* * * * *